US011048803B2

(12) United States Patent
Nikolai et al.

(10) Patent No.: US 11,048,803 B2
(45) Date of Patent: Jun. 29, 2021

(54) PORTABLE SECURITY TESTING DEVICE

(71) Applicant: International Business Machines Corporation, Armonk, NY (US)

(72) Inventors: Jason A. Nikolai, Rochester, MN (US); Steven Ocepek, Cuyahoga Falls, OH (US); Johnny Al Shaieb, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/406,493

(22) Filed: May 8, 2019

(65) Prior Publication Data

US 2020/0356674 A1    Nov. 12, 2020

(51) Int. Cl.
  *G06F 21/57*    (2013.01)
  *G06F 8/61*    (2018.01)
(52) U.S. Cl.
  CPC .............. *G06F 21/577* (2013.01); *G06F 8/61* (2013.01); *G06F 2221/034* (2013.01)
(58) Field of Classification Search
  CPC .................................. G06F 21/577; G06F 8/61
  See application file for complete search history.

(56) References Cited

U.S. PATENT DOCUMENTS

| | | | |
|---|---|---|---|
| 7,607,174 B1 * | 10/2009 | Kashchenko | G06F 21/554 726/25 |
| 9,923,917 B2 * | 3/2018 | Fausto | H04L 63/1433 |
| 10,264,018 B1 * | 4/2019 | Sites | G06N 3/08 |
| 2006/0048218 A1 * | 3/2006 | Lingafelt | H04L 63/0227 726/11 |
| 2009/0044263 A1 * | 2/2009 | Lingafelt | H04L 67/303 726/13 |
| 2013/0160130 A1 * | 6/2013 | Mendelev | G06F 21/56 726/25 |
| 2014/0007192 A1 | 1/2014 | Qureshi et al. | |
| 2014/0082735 A1 * | 3/2014 | Beskrovny | H04L 63/1433 726/25 |

(Continued)

OTHER PUBLICATIONS

Tenable, Four Ways to Achieve More Efficient and Effective Vulnerability Management Leveraging Analytics and Automated Workflow in Tenable SecurityCenter, Jan. 14, 2016, 17 pages (Year: 2016).*

(Continued)

*Primary Examiner* — Oleg Korsak
(74) *Attorney, Agent, or Firm* — Yee & Associates, P.C.

(57) ABSTRACT

A method, apparatus, system, and computer program product for operating a portable security testing device. The portable security testing device is configured by computer system with an operating system and a starting set of security testing tools. A selected set of the security testing tools is determined by the computer system for the portable security testing device based on information collected about a target by the portable security testing device. The starting set of the security testing tools in the portable security testing device is changed by the computer system to form a current set of the security testing tools in response to the starting set of the security testing tools being different from the selected set of the security testing tools, wherein the current set of the security testing tools operate to perform security tests on the target.

18 Claims, 7 Drawing Sheets

(56) References Cited

U.S. PATENT DOCUMENTS

| | | |
|---|---|---|
| 2014/0370857 A1 | 12/2014 | Bovis |
| 2016/0381510 A1 | 12/2016 | Reynolds |
| 2017/0019421 A1* | 1/2017 | Hebert ................ H04L 63/1408 |
| 2017/0093910 A1* | 3/2017 | Gukal ................ H04L 63/1425 |
| 2019/0068631 A1* | 2/2019 | Ashkenazy ......... H04L 63/1433 |
| 2019/0081974 A1* | 3/2019 | Lasser .................... H04L 63/20 |

OTHER PUBLICATIONS

Allan, "Build a Raspberry Pi Scanner that Tracks the Devices Connected to Your Local Network," Makezine.com, Aug. 16, 2017, accessed Apr. 9, 2019, 44 pages. https://makezine.com/projects/build-raspberry-pi-network-scanner/.

Sanghvi et al., "Cyber Reconnaissance: An Alarm before Cyber Attack," International Journal of Computer Applications, vol. 63, No. 6, Feb. 2013, pp. 36-38.

\* cited by examiner

PORTABLE SECURITY TESTING DEVICE

BACKGROUND

1. Field

The disclosure relates generally to an improved computer system and more specifically to a method, apparatus, system, and computer program product for configuring a portable security testing device.

2. Description of the Related Art

A penetration test is also referred to as a pen test and is an authorized attack on a computer system. This type of attack is performed to evaluate the security of the computer system. This type of test is performed to identify both vulnerabilities and strengths of the computer system. A penetration test has a number of different phases. These phases include reconnaissance which is used to identify weak points in the computer system.

The testing can include evaluating the physical security for the computer system. This testing can determine weaknesses and strengths in physical barriers to sensitive areas. Penetration testers may attempt to enter a physical facility and attempt to gain access to the sensitive areas in the facility where the computer system is located. These testers may also carry portable security testing devices that scan for radio frequencies and collect information about networks that use wireless technology standards for access. These wireless technology standards include, for example, Wi-Fi, Bluetooth, or other wireless standards. The testers may also leave packages or objects that include portable security testing devices with testing tools to scan the computer system.

In other instances, packages with portable security testing devices may be mailed or delivered to the facility. These portable security testing devices can perform passive and active testing of wireless networks for the computer system that are detected. In this manner, information can be collected for use in performing additional testing of the computer system.

SUMMARY

According to one embodiment of the present invention, a method operates a portable security testing device. The method configures the portable security testing device with an operating system and a starting set of security testing tools. A selected set of the security testing tools is determined for the portable security testing device based on information collected by the portable security testing device. The starting set of the security testing tools in the portable security testing device is changed to form a current set of the security testing tools in response to the starting set of the security testing tools being different from the selected set of the security testing tools, wherein the current set of the security testing tools operate to perform security tests on the target.

According to another embodiment of the present invention, a portable security testing device management system comprises a computer system. The computer system configures a portable security testing device with an operating system and a starting set of security testing tools. The computer system determines a selected set of the security testing tools for the portable security testing device based on information collected by the portable security testing device for a target. The computer system changes the starting set of the security testing tools in the portable security testing device to form a current set of the security testing tools in response to the starting set of the security testing tools being different from the selected set of the security testing tools, wherein the current set of the security testing tools operate to perform security tests on the target.

According to yet another embodiment of the present invention, a computer program product for operating a portable security testing device comprises a computer-readable-storage media with first program code, second program code, and third program code stored on the computer-readable storage media. First program code is executed to configure the portable security testing device with an operating system and a starting set of security testing tools. Second program code is executed to determine a selected set of the security testing tools for the portable security testing device based on information about a target collected by the portable security testing device. Third program code is executed to change the starting set of the security testing tools in the portable security testing device to form a current set of the security testing tools in response to the starting set of the security testing tools being different from the selected set of the security testing tools, wherein the current set of the security testing tools operate to perform security tests on the target.

DETAILED DESCRIPTION

Figure 1:
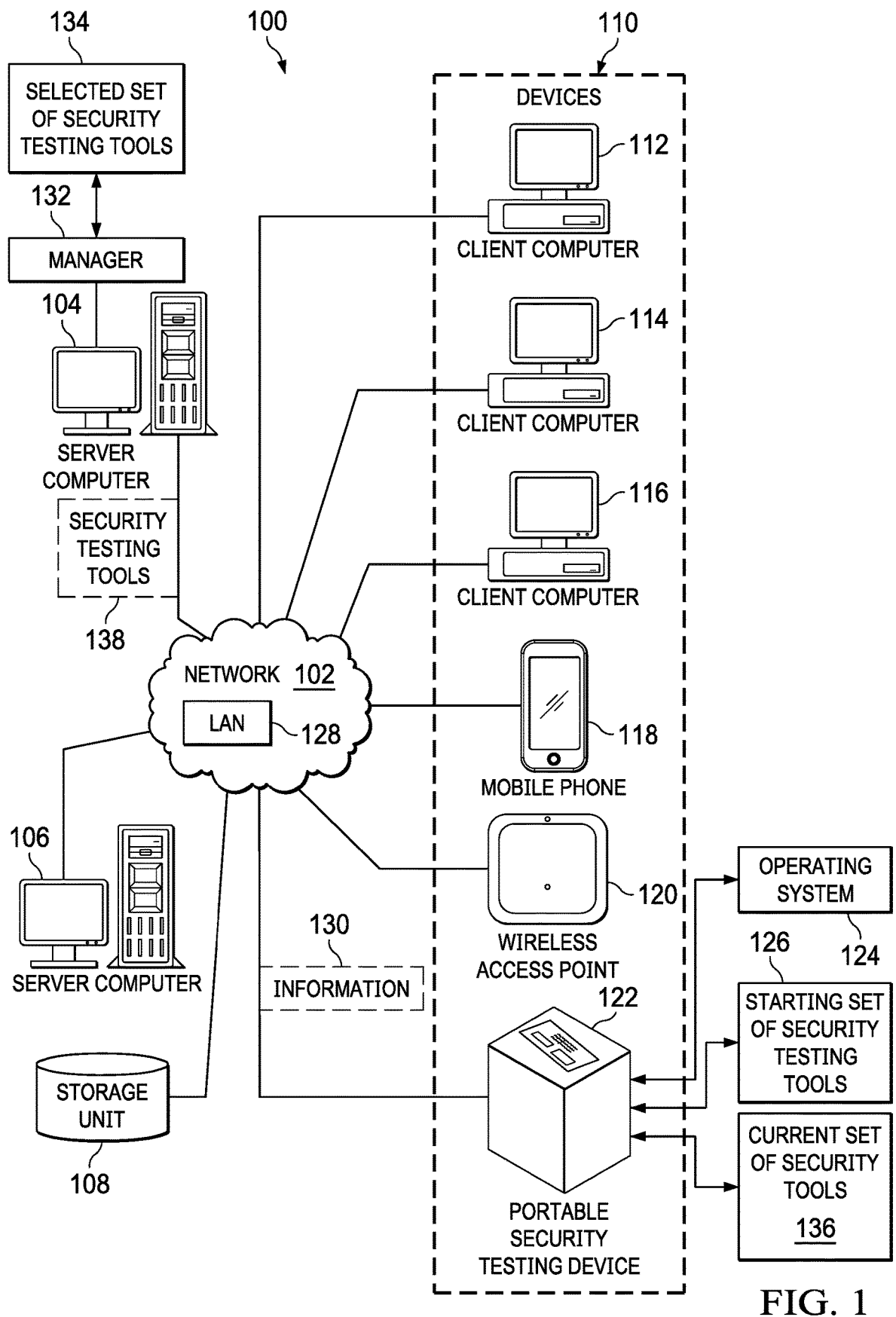
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that portable security devices used in penetration tests are battery-powered and thus have a limited amount time to collect information and perform attacks.

Additionally, the illustrative embodiments recognize and take into account that security testing tools are loaded onto the portable security testing device based on early reconnaissance of the target. The illustrative embodiments also recognize and take into account these devices have a limited amount of memory. The illustrative embodiments recognize and take into account that with the limited amount of memory, limited battery life, or both, that it is not possible to load every security testing tool that might be needed for testing a target onto the portable security testing device based on early reconnaissance of the target.

Thus, the illustrative embodiments recognize and take into account that currently selecting security testing tools for a portable security device can require significant analysis and work to configure the portable security testing device for each customer for which testing is performed. The illustrative embodiments also recognize and take into account that penetration testing is typically conducted in a time boxed window by a person with tools. This testing is typically bound to a certain location and is restricted by human factors.

Therefore, it would be desirable to have a method and apparatus that take into account at least some of the issues discussed above, as well as other possible issues. For example, it would be desirable to have a method and apparatus that overcome a technical problem with limited operating time and limited storage space in portable security testing devices.

Thus, the illustrative embodiments provide a method, apparatus, system, and computer program product for operating a portable security testing device. In one illustrative example, a method for operating a portable security testing device. The portable security testing device is configured by computer system with an operating system and a starting set of security testing tools. Responsive to the portable security testing device collecting information about a target, a selected set of the security testing tools is determined by the computer system for the portable security testing device based on information collected by the portable security testing device. The starting set of the security testing tools in the portable security testing device is changed by the computer system in response to the starting set of the security testing tools being different from the selected set of the security testing tools to form a current set of the security testing tools, wherein the selected set of the security testing tools operate to perform security tests on the target.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, devices 110 connect to network 102. As depicted, devices 110 include client computer 112, client computer 114, and client computer 116. Devices 110 can be, for example, computers, workstations, or network computers. In the depicted example, server computer 104 provides information, such as boot files, operating system images, and applications to devices 110. Further, devices 110 can also include other types of devices such as mobile phone 118, wireless access point 120, and portable security testing device 122. In this illustrative example, server computer 104, server computer 106, storage unit 108, and devices 110 are network devices that connect to network 102 in which network 102 is the communications media for these network devices.

Devices 110 are clients to server computer 104 in this example. Network data processing system 100 may include additional server computers, client computers, and other devices not shown. Devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to devices 110 over network 102 for use on devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Portable security testing device 122 is used as part of a penetration test for a target. In this illustrative example, the target is local area network (LAN) 128 in network 102. Server computer 104, storage unit 108, client computer 112, client computer 114, client computer 116, mobile phone 118, and wireless access point 120 are data processing devices that connect to LAN 128.

In this illustrative example, portable security testing device 122 is moved towards a physical location where part or all of LAN 128 is located. Portable security testing device 122 can reach the physical location for LAN 128 in a number of different ways. For example, portable security testing device 122 can be mailed, hand-delivered to, or otherwise physically placed in the physical location for LAN 128.

As depicted, portable security testing device 122 is configured with an operating system 124 and a starting set of security testing tools 126. With operating system 124 and starting set of security testing tools 126, portable security testing device 122 can conduct reconnaissance of LAN 128 such as scanning the environment around portable security testing device 122 to search for data computing devices in LAN 128.

In this illustrative example, portable security testing device 122 can scan the environment around portable security testing device 122 for wireless signals using security testing tools such as a radio frequency tool or a network scanner. These wireless signals are radio frequency signals. Additionally, depending on the packaging for portable security testing device 122, this device can also scan for infrared signals, optical signals, or other suitable types of signals.

For example, portable security testing device 122 can detect the presence of a Wi-Fi network in LAN 128 through Wi-Fi signals generated by wireless access point 120. "Wi-Fi" is a trademark of the Wi-Fi alliance. A Wi-Fi signals refer to radio frequency signals that are transmitted in a manner that follows a family of IEEE 802.11 standards.

As another example, portable security testing device 122 can detect the presence of a Bluetooth device such as mobile phone 118 from Bluetooth signals transmitted by mobile phone 118. "Bluetooth" is a trademark of Bluetooth SIG. Bluetooth refers to a standard for exchanging data between devices using ultrahigh frequency (UHF) radio frequency signals. In this illustrative example, mobile phone 118 is a rogue wireless access point, allowing portable security testing device 122 access to LAN 128 through the connection that mobile phone 118 has to LAN 128. In this illustrative example, a rogue wireless access point is a wireless access point installed on a network without knowledge of the system administrator or other security personnel.

As depicted, portable security testing device 122 collects information 130 about LAN 128 through wireless access point 120. Information 130 can be audit data associated with at least one of geographic coordinates or a time stamp. Additionally, portable security testing device 122 can also collect information about LAN 128 through mobile phone 118 which is connected to LAN 128. Information 130 can include, for example, information about other devices connected to LAN 128, data packets, radio frequencies used, and other information that can be derived from mobile phone 118 and wireless access point 120.

In this illustrative example, portable security testing device 122 sends information 130 to manager 132 running server computer 104. Information 130 can be sent to manager 132 over one or more different networks in network 102 other than or in addition to LAN 128. For example, a cellular network in network 102 can be used to send information 130. In some illustrative examples, information 130 can be sent over the Internet through LAN 128 to manager 132 in server computer 104.

In response to receiving information 130, manager 132 can analyze information 130 and determine selected set of security testing tools 134. In one illustrative example, selected set of security testing tools 134 is selected based at least one of a device characteristic, the starting operating system, an amount of memory, a battery life, target information, or some other factor.

When selected set of security testing tools 134 is different from starting set of security testing tools 126, manager 132 changes starting set of the security testing tools 126 in the portable security testing device to form current set of security testing tools 136. For example, manager 132 can download a number of security testing tools 138 to portable security testing device 122 to form current set of security testing tools 136. As used herein, a "number or" when used with reference to items means one or more items. For example, a number of security testing tools 138 is one or more of security testing tools 138.

In another illustrative example, manager 132 can remove or uninstall one or more of starting set of security testing tools 126 to form current set of security testing tools 136. Thus, an unneeded security testing tool may be removed to make space for additional security testing tools to form current set of security testing tools 136.

Portable security testing device 122 can perform additional tests, passive and active, and send additional information collected about LAN 128 from those tests. Additional information can be used to determine whether additional changes should be made to the set of security testing tools in portable security testing device 122. The sending of additional information can be performed based upon the periodic events or nonperiodic events. For example, with a periodic event such as passage of a selected amount of time, information can be sent after the selected amount of time. In this example, the nonperiodic event can be the collection of a selected amount of information.

Further, portable security testing device 122 can cycle between an active mode and an inactive mode. This changing of modes can be performed to maximize battery life for portable security testing device 122. For example, portable security testing device 122 can shift to an active mode in response to a movement of portable security testing device 122. This movement may be based upon movement, movement with respect to geographical coordinates or movement with respect to a device at the target. For example, portable security testing device 122 reaches the physical location of the target, portable security testing device 122 may increase the frequency in which portable security testing device 122 shifts to an active mode as compared to when portable security testing device 122 is in transit to the location of the LAN 128. The amount of time in the active mode can increase when portable security testing device 122 reaches the physical location for LAN 128.

As another illustrative example, portable security testing device 122 may change the frequency in switching between an active mode and an interactive mode based on the amount of new information that is collected about LAN 128. When new information is not collected about LAN 128, the frequency at which portable security testing device 122 switches to the active mode decreases.

When no more new data after a period of time when no more new information is collected about LAN 128, portable security testing device 122 sends a final transmission of information to manager 132. At this point, all, some, or none of the security testing tools upon portable security testing device 122 can be removed. The removal of security testing tools may increase battery life for portable security testing device 122.

With the changing of the security testing tools in portable security testing device 122, security testing tools can be added after portable security testing device 122 has begun collecting information. In this illustrative example, issues with at least one of limited memory or battery life can be reduced.

Figure 2:
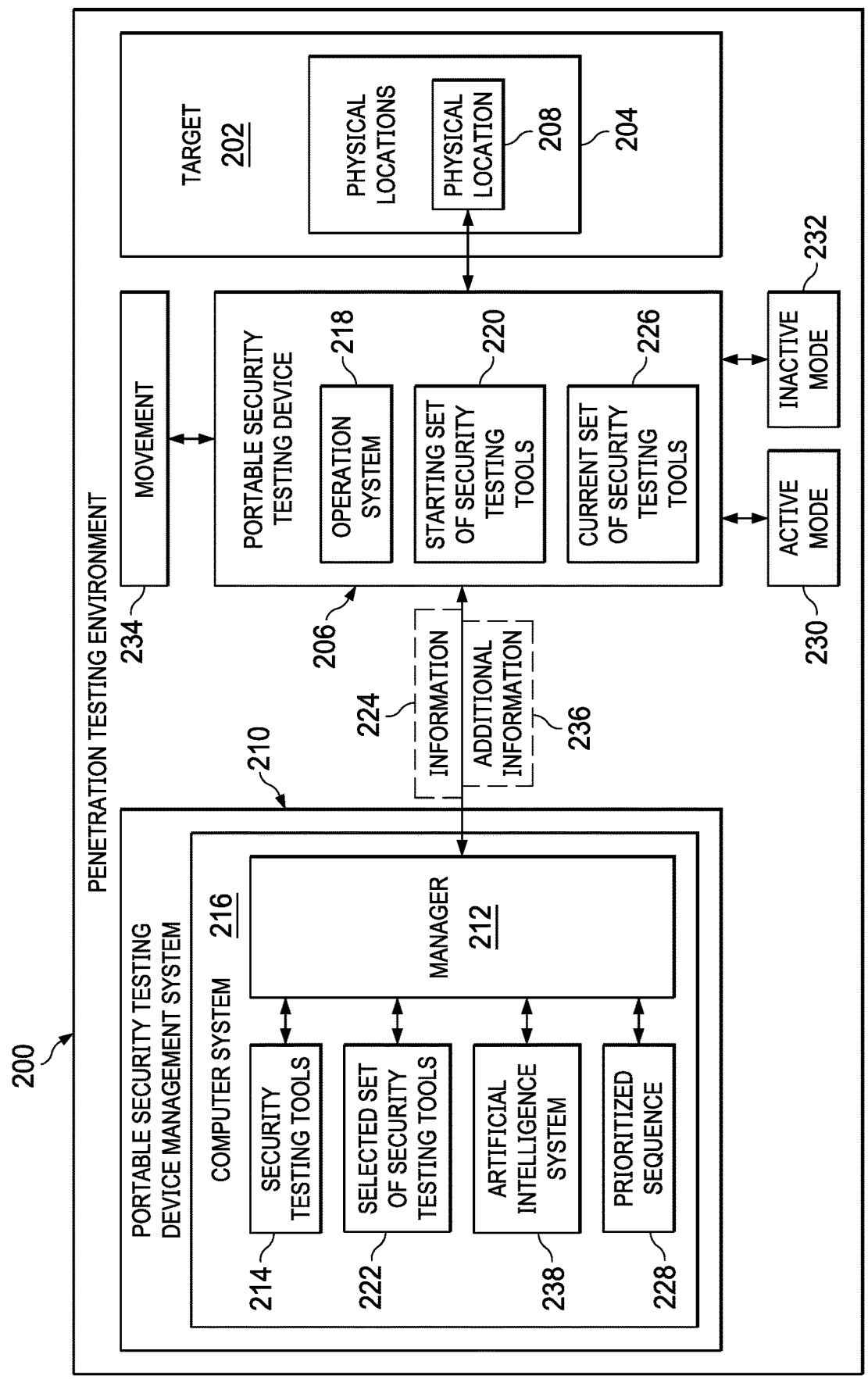
FIG. 2 is a block diagram of a penetration testing environment in accordance with an illustrative embodiment.

With reference now to FIG. 2, a block diagram of a penetration testing environment is depicted in accordance with an illustrative embodiment. In this illustrative example, penetration testing environment 200 includes components that can be implemented in hardware such as the hardware shown in network data processing system 100 in FIG. 1.

In this illustrative example, penetration testing is performed on target 202 in penetration testing environment 200. Target 202 can take a number of different forms. Target 202 can be a local area network, a metropolitan area network, an intranet, a work station, a server computer, or some other suitable data processing device or grouping of data processing devices. Target 202 can be physically located in a number of physical locations 204.

As depicted, portable security testing device 206 is configured for use in penetration testing at physical location 208 in the number of physical locations for target 202. In this illustrative example, portable security testing device 206 can be dynamically configured by portable security testing device management system 210 while operating at physical location 208 for target 202. Portable security testing device management system 210 comprises manager 212 and security testing tools 214 in computer system 216.

Manager 212 can be implemented in software, hardware, firmware or a combination thereof. When software is used, the operations performed by manager 212 can be implemented in program code configured to run on hardware, such as a processor unit. When firmware is used, the operations performed by manager 212 can be implemented in program code and data and stored in persistent memory to run on a processor unit. When hardware is employed, the hardware may include circuits that operate to perform the operations in manager 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 216 is a physical hardware system and includes one or more data processing systems. When more than one data processing system is present in computer system 216, those data processing systems are in communication with each other using a communications medium. The communications medium can be a network. The data processing systems can be selected from at least one of a computer, a server computer, a tablet computer, or some other suitable data processing system.

As depicted, security testing tools 214 are software that can be installed and run on portable security testing device 206 to perform tests on target 202. These tests may include passive tests and active tests. Passive tests may be used for reconnaissance, while active tests may be used to perform attacks. The software for security testing tools can take a number of different forms. For example, the software can be selected from at least one of an application, a script, a device driver, a plug-in module, or some other suitable form program code that can be run by portable security testing device 206.

In this illustrative example, manager 212 in computer system 216 configures portable security testing device 206 with operating system 218 and starting set of security testing tools 220. As depicted, starting set of security testing tools 220 is a subset of security testing tools 214. In this example, all of security testing tools 214 cannot be installed in portable security testing device 206.

Further, operating system 218 can be selected based on the characteristics of the operating system for use in penetration testing. In the illustrative examples, operating system 218 can be selected from operating systems that support penetration testing. For example, operating system 218 can be selected from a group comprising Kali Linux, ParrotOS, BlackBox, Pentoo, BlackArch, MX Linux, and other suitable types of operating systems. In some cases, operating system 218 can be a custom build that is created for a particular type of penetration test.

As depicted, starting set of security testing tools 220 can be selected from security testing tools 214. In this illustrative example, security testing tools 214 can be selected from at least one of a passive security testing tool, an active security testing tool, a radio frequency tool, a port scanner, a network scanner, a system fingerprint tool, a penetration testing tool, or some other type security testing tool. Further, starting set of security testing tools 220 can be part of operating system 218. In other words, operating system 218 can include device drivers or other components that can be security testing tools.

In this illustrative example, operating system 218 and starting set of security testing tools 220 can be installed prior to moving portable security testing device 206 to physical location 208.

In this illustrative example, manager 212 receives information 224 from portable security testing device 206. Information 224 can be transmitted by portable security testing device 206 to manager 212 using cellular signals over a cellular network. In another example, portable security testing device 206 can send information 224 using wireless transmissions over a wireless network or wireless access port in target 202.

As depicted, information 224 can be received by manager 212 in a number of different forms. For example, information 224 can be in a form of audit data associated with at least one of geographic coordinates or a time stamp. The audit data can be any data that portable security testing device 206 collects about target 202. For example, the audit data in information 224 includes at least one of a type of wireless transmission, a radio frequency, an open port, an IP address for a hardware device, a protocol, a detected radio frequency, a network device identification, software running on a network, hardware attached to the network, a server IP address, a DHCP server address, a device configuration, a SSL certificate, a DNS server, a device address, a host name, an application usage, or other suitable information.

In this illustrative example, the geographic coordinates identify the location of the portable security testing device 206 when a piece of information in the audit data was collected. The geographic coordinates can be latitude and longitude and can also include altitude. This information can be identified using a global positioning system receiver in portable security testing device 206.

The timestamp identifies the time when a piece of information in the audit data was collected by portable security testing device 206. The time includes time of day, month, day of the month, and year.

As depicted, manager 212 determines selected set of security testing tools 222 for portable security testing device 206 based on information 224 about target 202 collected by portable security testing device 206. The determination can be in response to portable security testing device 206 collecting information 224 about target 202. Manager 212 compares the selected set of security testing tools 222 with the starting set of security testing tools 220 for portable security testing device 206. In response to starting set of security testing tools 220 being different from selected set of the security testing tools 222, manager 212 changes starting set of the security testing tools 220 in portable security testing device 206 to form current set of security testing tools 226. In this illustrative example, current set of security testing tools 226 operate to perform security tests on the target 202.

Manager 212 can change starting set of the security testing tools 220 in the portable security testing device to form current set of the security testing tools 226 in a number of different ways. For example, manager 212 can install a first subset of security testing tools 214 in selected set of the security testing tools 222 that is absent in starting set of the security testing tools 220 in portable security testing device 206 to form current set of security testing tools 226.

The first subset of security testing tools 214 can be installed in prioritized sequence 228 to form current set of security testing tools 226. Prioritized sequence 228 identifies the order in which needed security testing tools are to be installed in portable security testing device 206. In this manner, security testing tools that are needed sooner to perform tests are installed before other security testing tools.

This prioritization of security tool installation can be used to take into account a situation in which the communications with portable security testing device 206 may be intermittent or have a quality level that does not allow for installing all of the security testing tools before a connection is lost or before the portable security testing device 206 needs to perform tests on target 202 or cycle to from active mode 230 to inactive mode 232. In this illustrative example, inactive mode 232 is a state of portable security testing device 206 that reduces power usage. The state may be implemented as a sleep state, a hibernation state, or some other suitable state that reduces the use of battery-powered. In some illustrative examples, certain functions may run in a manner that reduces power use.

Portable security testing device 206 may need to cycle to inactive mode 232 to avoid discovery. As a result, the connection for downloading and installing security testing tools may need to be put on hold while portable security testing device 206 cycles to an inactive mode 232.

Further, not all of the security testing tools may be installed at the same time because the set of set of security testing tools needed may change over the duration of the test as the reconnaissance phase gathers data about target 202. Portable security testing device 206 has limited capacity based on the form factor (e.g., battery life and storage); hence, minimizing the footprint of tooling can be critical for completion of a test. This foot print can be reduced by installing a first subset of security testing tools 214 over time based on the priority determined for the first subset of security testing tools 214 instead of installing all of the first subset of security testing tools 214. As additional information 236 is collected, the analysis of additional information 236 may result in a change in what security testing tools 214 are needed. As a result, this change can be made more easily if a security testing tool that is now no longer needed has not already been installed in the first subset of security testing tools 214 because that security testing tool had a lower priority.

In another example, manager 212 removes a second subset of security testing tools 214 in starting set of the security testing tools 220 installed in portable security testing device 206 that is absent in selected set of the security testing tools 222 to form current set of security testing tools 226. This removal of security testing tools 214 can be optionally performed to increase memory or storage space in portable security testing device 206.

In the illustrative example, portable security testing device 206 cycles between active mode 230 and inactive mode 232 in response to movement 234 of portable security testing device 206 towards target 202. For example, while portable security testing device 206 is in transit to physical location 208 for target 202, movements 234 can cause portable security testing device 206 to shift into active mode 230. During this active mode, portable security testing device 206 can determine geographic coordinates of portable security testing device 206 with respect to geographic coordinates for physical location 208 of target 202. In this illustrative example, the geographic coordinates can be such as latitude, longitude, and altitude. If the geographic coordinates of the portable security testing device 206 is not the geographic coordinates of physical location 208 or within some threshold distance, portable security testing device 206 shifts back into the inactive mode 232.

As portable security testing device 206 approaches the geographic coordinates for physical location 208, the frequency at which portable security testing device 206 switches between active mode 230 and inactive mode 232 can increase. Further, when portable security testing device 206 reaches physical location 208, at least one of the frequency of shifting between active mode 230 and inactive mode 232 or the length of time during which portable security testing device 206 is an active mode 230 can increase.

In the illustrative example, the frequency at which at which portable security testing device 206 switches between active mode 230 and inactive mode 232 can decrease when new information is not collected while security testing device is in active mode 230. Further, in some point in time, portable security testing device 206 will have finished collecting information 224. This point can be reached, for example, when at least one of a threshold level for battery life is reached or no new information is collected for some selected period of time.

During active mode 230, portable security testing device 206 can use current set of security testing tools 226 to perform various types of tests on target 202. This testing can include passive and active tests.

With passive tests, portable security testing device 206 performs reconnaissance on target 202. For example, information in target 202 is read or collected without influencing system resources in target 202. In other words, information in target 202 is not modified. These tests can include at least one of a Wi-Fi network scan, a network and port scan, a system finger printing, frequency and radio listening to detect other potential targets and capture data, capture network data, or perform other operations to collect information 224 about target 202.

In this illustrative example, with active tests, portable security testing device 206 performs attacks on target 202. These attacks attempt to change system resources or affect their operation in target 202. With this type of test, modification of information in target 202 can occur.

As depicted, portable security testing device 206 sends additional information 236 back to manager 212. This sending of additional information 236 can be performed at least one of periodically or non periodically such as in response to an event. The non-event can be, for example, the collection of new information, reaching a memory threshold, or some other event.

Manager 212 can analyze additional information 236 to select additional testing tools for use by portable security testing device 206. These additional security testing tools can be sent to portable security testing device 206 to perform additional tests using these tools. These additional tests can include those perform to reconnaissance or attacks.

The determination of these security testing tools and determination of selected set of security testing tools 222 by manager 212 can be performed in a number of different ways. For example, information 224 and additional information 236 can be analyzed and compared to patterns. For example, an operating system or application that is fingerprinted in target 202 can be used to select security testing tools 214. This information can be used with a vulnerabilities database to identify a vulnerability and a security tool to test for the vulnerability. The vulnerabilities database can be, for example, Common Vulnerabilities and Exposures (CVE), the National Vulnerability Database (NVD), or some other suitable database.

In another illustrative example, manager 212 can use artificial intelligence system 238 to determine which ones of security testing tools 214 should be used by portable security testing device 206. Artificial intelligence system 238 is a system that has intelligent behavior and can be based on function of the human brain. An artificial intelligence system comprises at least one of an artificial neural network, a cognitive system, a Bayesian network, a fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system. A cognitive system is a computing system that mimics the function of a human brain.

With artificial intelligence system 238, information about targets received from portable security testing device 206 and from other portable security testing devices over time can be used for machine learning to improve the manner in which security testing tools are selected for approval security testing devices. Over time, the information collected from portable security testing devices can by analyzed using existing data mining and machine learning techniques. The analysis can identify common conditional patterns which can improve preloading portable security testing devices prior to deployment or improve the timing of dynamically loading and unloading of security testing tools installed in deployed portable security testing devices.

Further, if portable security testing device 206 is found by security teams for target 202, forensic data can be used to determine where in the reconnaissance phase that the portable security testing device 206 is detected and offensive security testers can improve attack tactics to penetrate the defenses. The information can also be used to improve cycle timings between active modes and inactive modes to optimize when scans and calls sending information to manager 212 occur.

In this illustrative example, one or more technical solutions are present that overcome a technical problem with the limitation of how many security testing tools can be loaded onto portable security testing devices used in penetration tests. As a result, one or more technical solutions may provide a technical effect enabling desired testing of targets by portable security testing devices through dynamically adjusting the security testing tools installed on portable security testing devices Further, the illustrative examples expand on the current techniques used by human testers by providing a dynamic portable security testing device with security testing tools that can be dynamically changed by manager 212 to conducts testing such as reconnaissance and attacks over time and space. The illustrative examples provide for a more thorough security testing and can reveal weaknesses previously undetected with current techniques.

Computer system 216 can be configured to perform at least one of the steps, operations, or actions described in the different illustrative examples using software, hardware, firmware or a combination thereof. As a result, computer system 216 operates as a special purpose computer system in which manager 212 in computer system 216 enables dynamically adjusting the security testing tools on portable security testing devices deployed at targets. In particular, manager 212 transforms computer system 216 into a special purpose computer system as compared to currently available general computer systems that do not have manager 212.

The illustration of penetration testing environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more portable security testing devices in addition to or in place of portable security testing device 206 can be deployed to perform penetration tests on target 202. These portable security testing devices can be deployed to physical location 208 or other locations in physical locations 204 for target 202. These other portable security testing devices may have the same or different starting sets of security testing tools. These portable security testing devices can have the same specifications or different specifications from portable security testing device 206. The specifications include, for example, at least one battery life, memory, packaging, weight, communications capabilities, or other specifications.

In another illustrative example, manager 212 can manage portable security testing devices that are deployed to both of targets in addition to or in place of target 202.

Figure 3:
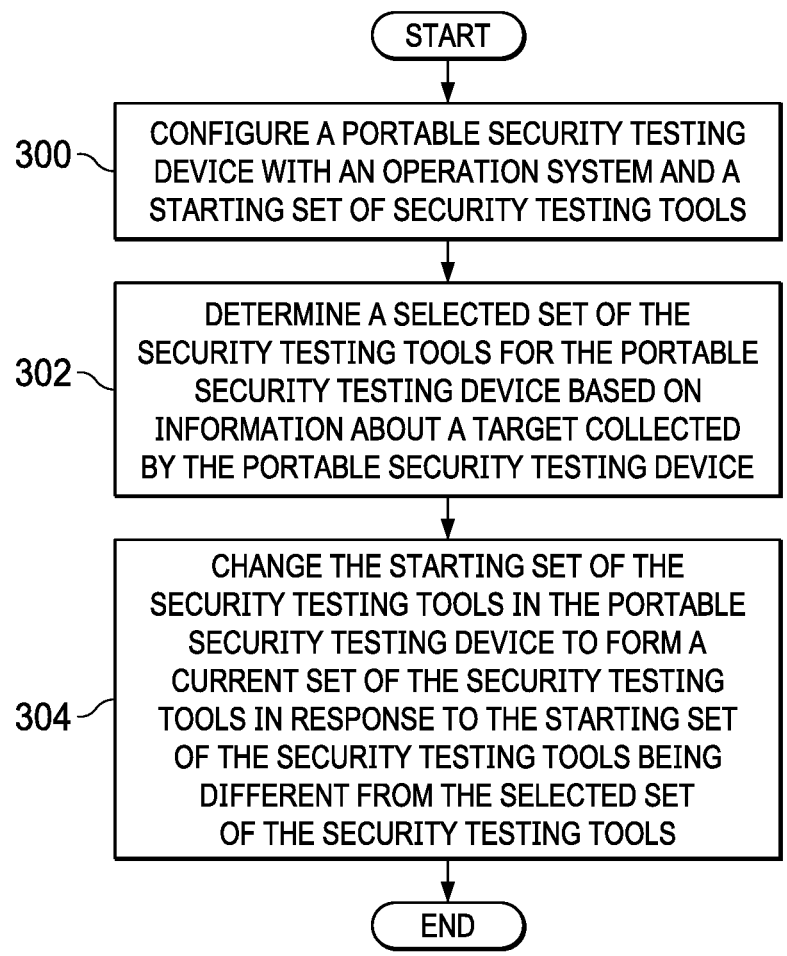
FIG. 3 is a flowchart of a process for operating a portable security testing device in accordance with an illustrative embodiment.

Turning next to FIG. 3, a flowchart of a process for operating a portable security testing device is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in manager 212 in computer system 216 in FIG. 2.

The process begins by configuring a portable security testing device with an operating system and a starting set of security testing tools (step 300). The process determines a selected set of the security testing tools for the portable security testing device based on information about a target collected by the portable security testing device (step 302).

The process changes the starting set of the security testing tools in the portable security testing device to form a current set of the security testing tools in response to the starting set of the security testing tools being different from the selected set of the security testing tools (step 304). The process terminates thereafter. The current set of the security testing tools operate to perform security tests on the target.

Figure 4:
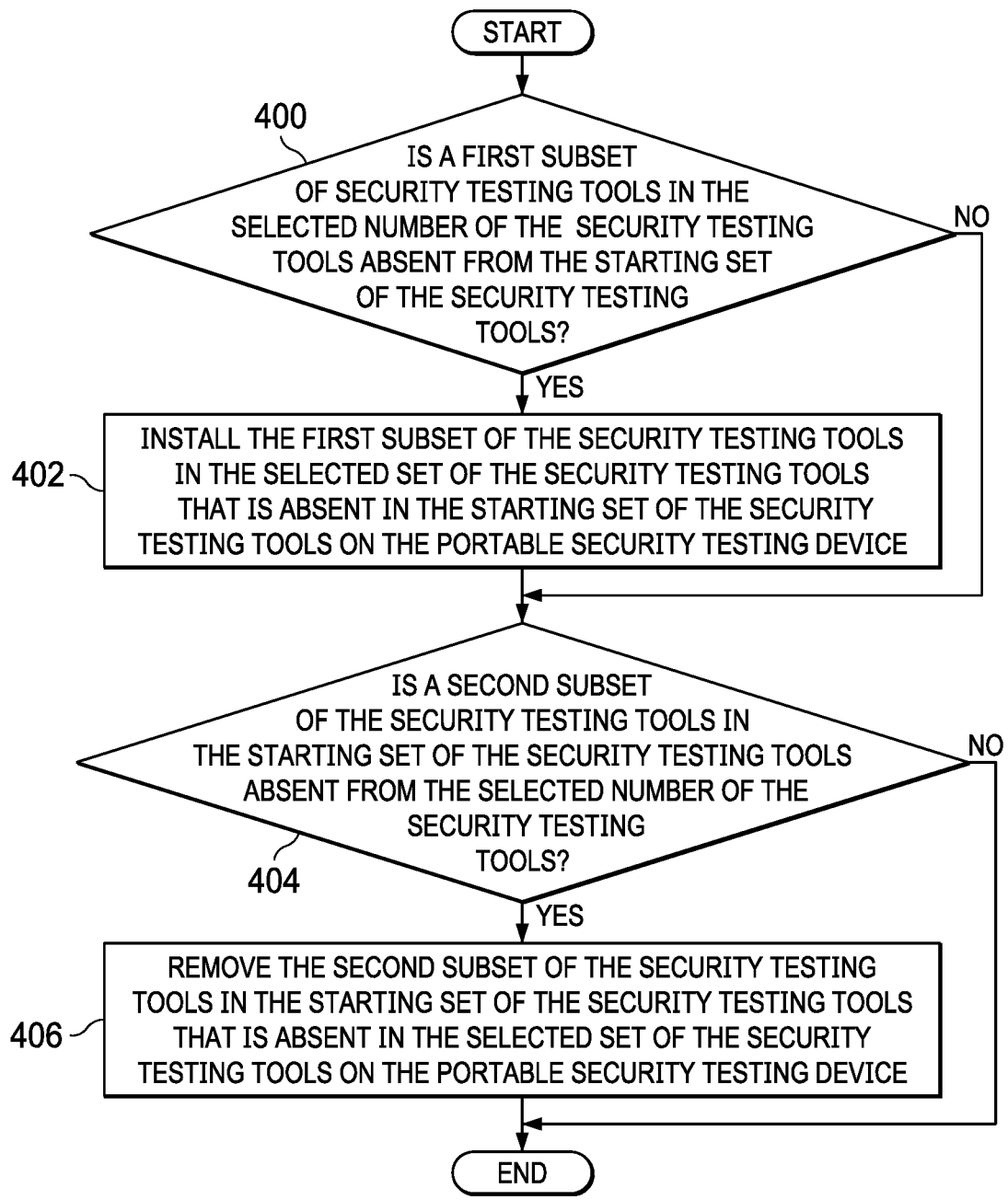
FIG. 4 is a flowchart of process for changing the starting set of security testing tools in accordance with an illustrative embodiment.

With reference next to FIG. 4, a flowchart of process for changing the starting set of security testing tools is depicted in accordance with an illustrative embodiment. As illustrated in FIG. 4 is an example of one manner in which step 304 in FIG. 3 can be implemented. This process is implemented when a difference is present between the starting set of security testing tools and the selected set of security testing tools determined to be needed for use by portable security testing device in testing the target.

The process begins by determining whether a first subset of security testing tools in the selected number of the security testing tools is absent from the starting set of the security testing tools (step 400). If the first subset of the security testing tools is absent, the process installs the first subset of the security testing tools in the selected set of the security testing tools that is absent in the starting set of the security testing tools on the portable security testing device (step 402).

The process then determines whether a second subset of the security testing tools in the starting set of the security testing tools is absent from the selected number of the security testing tools (step 404). If the second subset of the security testing tools is absent, the process removes the second subset of the security testing tools in the starting set of the security testing tools that is absent in the selected set of the security testing tools on the portable security testing device (step 406). The process terminates thereafter. With reference again to step 404, if the second subset of the security testing tools is present, the process terminates. With reference again to step 400, if the first subset of the security testing tools is not absent, the process proceeds to step 404 as described above.

Figure 5:
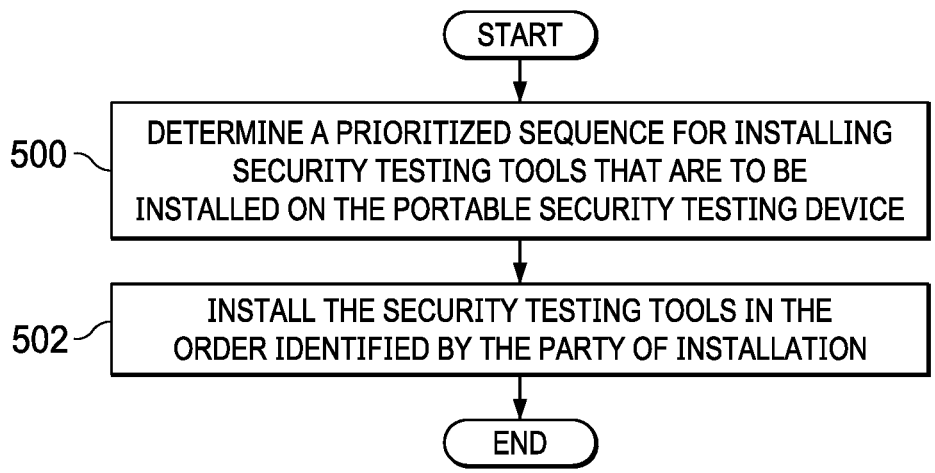
FIG. 5 is a flowchart of process for installing security testing tools in accordance with an illustrative embodiment.

Turning next to FIG. 5, a flowchart of process installing security testing tools is depicted in accordance with an illustrative embodiment. The process is an example of one implementation for step 402 in FIG. 4.

The process begins by determining a prioritized sequence for installing security testing tools that are to be installed on the portable security testing device (step 500). The process then installs the security testing tools in the order identified by the party of installation (step 502). The process terminates thereafter. In this illustrative example, step 502 can be performed over a period of time in which connections are established and terminated with the portable security testing device.

Figure 6:
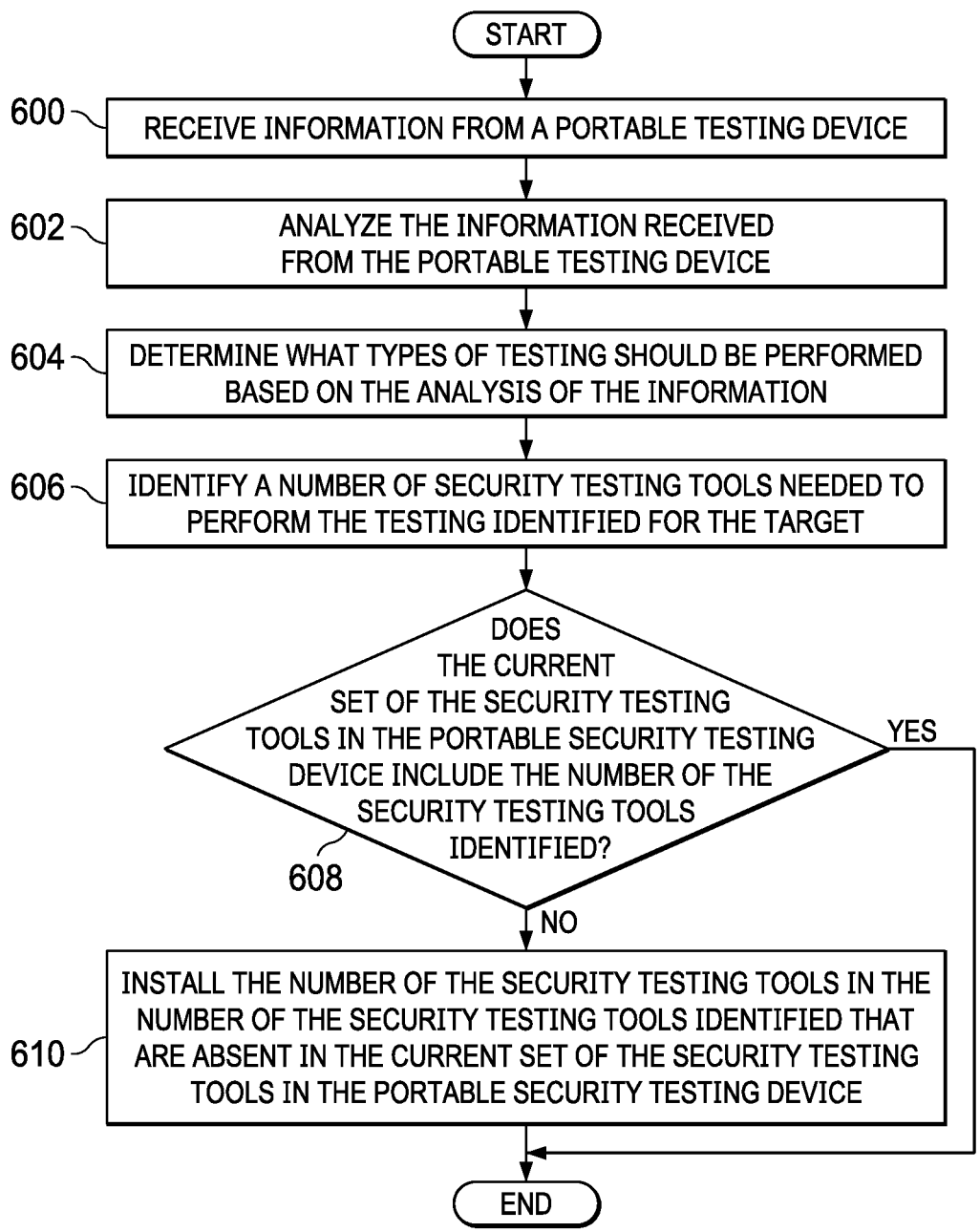
FIG. 6 is a flowchart of a process for dynamically configuring a portable testing device is depicted in accordance with an illustrative embodiment.

With reference now to FIG. 6, a flowchart of a process for dynamically configuring a portable testing device is depicted in accordance with an illustrative embodiment. The process in FIG. 6 can be implemented in hardware, software, or both. When implemented in software, the process can take the form of program code that is run by one of more processor units located in one or more hardware devices in one or more computer systems. For example, the process can be implemented in manager 212 in computer system 216 in FIG. 2.

The process begins by receiving information from a portable testing device (step 600). The process analyzes the information received from the portable testing device (step 602). A determination is made as to what types of testing should be performed based on the analysis of the information (step 604). In step 604, the analysis can identify tests that should be performed on the target. These tests can include passive and active tests.

The process identifies a number of security testing tools needed to perform the testing identified for the target (step 606). A determination is made as to whether the current set of the security testing tools in the portable security testing device include the number of the security testing tools identified (step 608). If current set of testing tools includes the number of the security testing tools, the process terminates. Otherwise, the process installs the number of the security testing tools in the number of the security testing tools identified that are absent in the current set of the security testing tools in the portable security testing device (step 610). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 7:
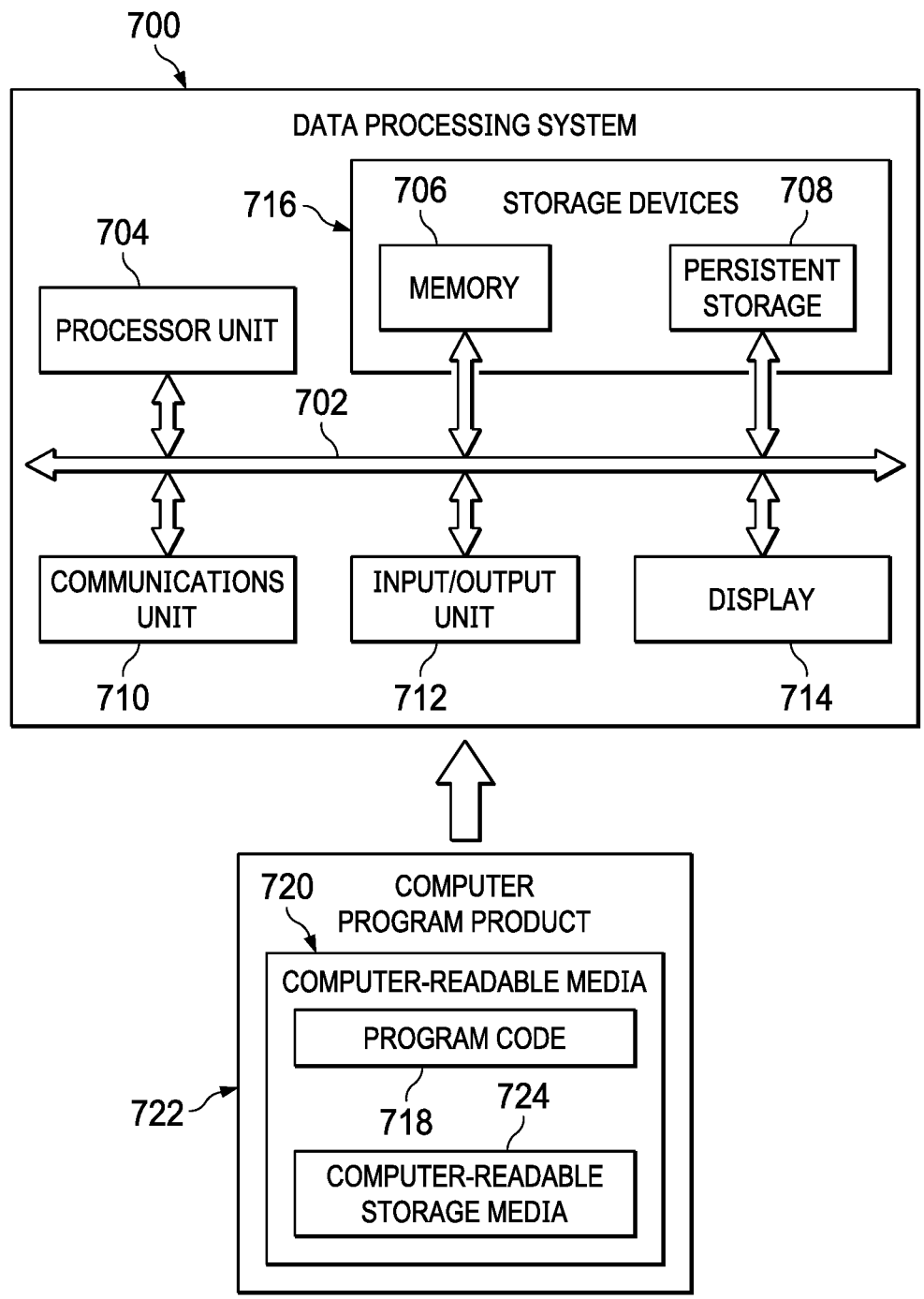
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement server computer 104, server computer 106, devices 110, in FIG. 1. Data processing system 700 can also be used to implement computer system 216. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 704 can may be implemented using one or more heterogeneous processor systems in which a main processor is present with secondary processors on a single chip. As another illustrative example, processor unit 704 can be a symmetric multi-processor system containing multiple processors of the same type on a single chip.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device.

Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program code, computer usable program code, or computer-readable program code that can be read and executed by a processor in processor unit 704. The program code in the different embodiments can be embodied on different physical or computer-readable storage media, such as memory 706 or persistent storage 708.

Program code 718 is located in a functional form on computer-readable media 720 that is selectively removable and can be loaded onto or transferred to data processing system 700 for execution by processor unit 704. Program code 718 and computer-readable media 720 form computer program product 722 in these illustrative examples. In the illustrative example, computer-readable media 720 is computer-readable storage media 724.

In these illustrative examples, computer-readable storage media 724 is a physical or tangible storage device used to store program code 718 rather than a medium that propagates or transmits program code 718.

Alternatively, program code 718 can be transferred to data processing system 700 using a computer-readable signal media. The computer-readable signal media can be, for example, a propagated data signal containing program code 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 700 are not meant to provide architectural limitations to the manner in which different embodiments can be implemented. In some illustrative examples, one or more of the components may be incorporated in or otherwise form a portion of, another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program code 718.

Figure 8:
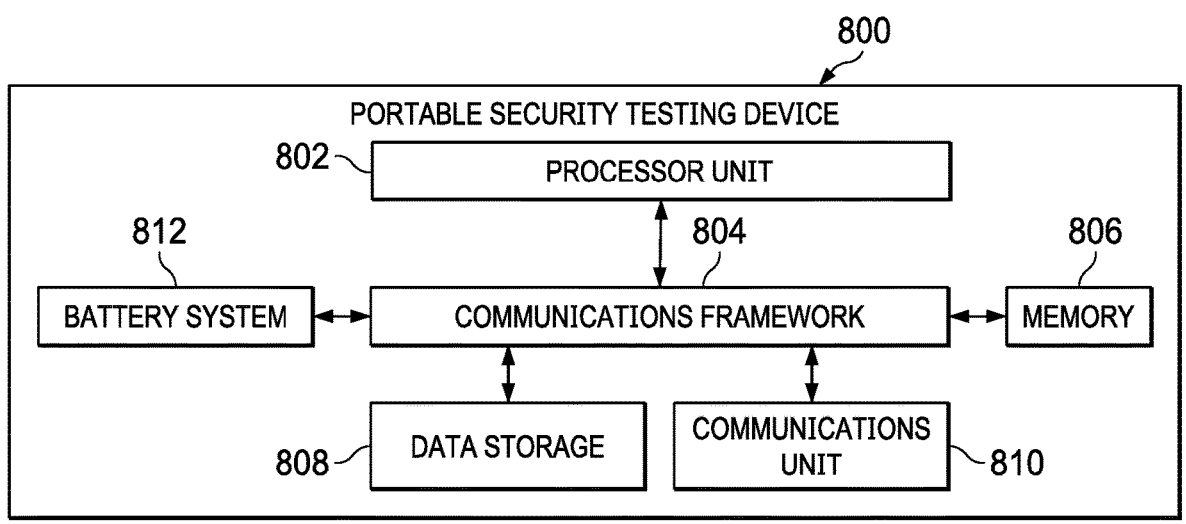
FIG. 8 is a block diagram of a portable security testing device in accordance with an illustrative embodiment.

With reference to FIG. 8, a block diagram of a portable security testing device is depicted in accordance with an illustrative embodiment. Portable security testing device 800 is an example of one manner in which portable security testing device 122 in FIG. 1 and portable security testing device 206 in FIG. 2 can be implemented. In this illustrative example, portable security testing device 800 includes physical hardware components such as processor unit 802, communications framework 804, memory 806, data storage 808, communications unit 810, and battery system 812.

Communications framework 804 allows different components in portable security testing device 800 to communicate with each other when connected to communications framework 804. Communications framework 804 is a bus system in this illustrative example.

As depicted, battery system 812 provides power to components connected to communications framework 804. In this illustrative example, communications framework 804 includes bus system. The bus system includes a power line through a current flow from battery system 812 other components provide power for those components to operate.

Processor unit 802 processes program code for software loaded into memory 806. Memory 806 can contain security testing tools, such as starting set of security testing tools 220 and current set of security testing tool 226. Processor unit 802 include one or more processors. For example, processor unit 802 can be selected from at least one of a multicore processor, a central processing unit (CPU), a graphics processing unit (GPU), a physics processing unit (PPU), a digital signal processor (DSP), a network processor, or some other suitable type of processor.

Memory 806 is connected to processor unit 802 through communications framework 804. As depicted, memory 806 can include at least one of a random access memory (RAM), a read-only memory (ROM), a static random access memory (SRAM), a dynamic random access memory (DRAM), or other suitable types of memory devices or circuits.

As depicted, data storage 808 is connected to communications framework 804 and can store data, program code, or other information. Instructions in program code can be loaded from data storage 808 into memory 806 for processing by processor unit 802. Data storage 808 can comprise at least one of a hard disk drive, a flash drive, a solid-state disk drive, an optical drive, or some other suitable type of data storage device or system.

In this illustrative example, communications unit 810 provides for communications with other data processing systems or devices. In these illustrative examples, communications unit 810 includes at least one of a network interface card, a wireless communications device, a universal serial bus port, or other suitable device. This illustrative example, communications unit 810 can provide for wireless communications to send information and receive security testing tools using wireless signals selected from at least one of cellular signals, Wi-Fi signals, Bluetooth signals, Zigbee signals, or other suitable types of wireless signals.

The illustration of portable security testing device 800 is an example of one manner in which portable security testing device 800 can be implemented. This illustration is not meant to limit the manner in which portable security testing device 800 can be embodied in other illustrative examples.

For example, portable security testing device 800 can include a microphone, camera, or other suitable hardware components in other illustrative examples.

Thus, illustrative embodiments of the present invention provide a computer implemented method, computer system, and computer program product for operating a portable security testing device. The portable security testing device is configured by computer system with an operating system and a starting set of security testing tools. Responsive to the portable security testing device collecting information about a target, a selected set of the security testing tools is determined by the computer system for the portable security testing device based on information collected by the portable security testing device. The starting set of the security testing tools in the portable security testing device is changed by the computer system in response to the starting set of the security testing tools being different from the selected set of the security testing tools, wherein the selected set of the security testing tools operate to perform security tests on the target.

In one illustrative example, problems with the limitation of how many security testing tools can be loaded onto portable security testing devices is overcome using manager 212 in FIG. 2 to dynamically configure portable security testing devices used in penetration tests of targets. As a result, one or more technical solutions may provide a technical effect enabling desired testing of targets by portable security testing devices through dynamically adjusting the security testing tools installed on portable security testing devices.

Further, the illustrative examples expand on the current techniques used by human testers by providing a dynamic portable security testing device with the security testing tools that can be dynamically changed by manager 212 to conducts testing such as reconnaissance and attacks overtime and space. The illustrative examples provide for a more thorough security testing and can reveal weaknesses previously undetected with current techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for operating a portable security testing device, the method comprising:
    configuring, by a computer system, the portable security testing device with an operating system and a starting set of security testing tools;
    determining, by the computer system, a selected set of the security testing tools for the portable security testing device based on information about a target collected by the portable security testing device;
    changing, by the computer system, the starting set of the security testing tools in the portable security testing device to form a current set of the security testing tools in response to the starting set of the security testing tools being different from the selected set of the security testing tools, wherein the current set of the security testing tools operate to perform security tests on the target; and
    cycling the portable security testing device between an active mode and an inactive mode in response to a movement of the portable security testing device towards the target.

2. The method of claim 1, wherein changing, by the computer system, the starting set of the security testing tools in the portable security testing device to form the current set of the security testing tools in response to the starting set of the security testing tools being different from the selected set of the security testing tools comprises:
    installing, by the computer system, a first subset of the security testing tools in the selected set of the security testing tools that is absent in the starting set of the security testing tools on the portable security testing device to form the current set of the security testing tools.

3. The method of claim 2, wherein installing, by the computer system, the first subset of the security testing tools in the selected set of the security testing tools that is absent in the starting set of the security testing tools on the portable security testing device to form the current set of the security testing tools comprises:
    installing, by the computer system, the first subset of the security testing tools in the selected set of the security testing tools that is absent in the starting set of the security testing tools on the portable security testing device in a prioritized sequence to form the current set of the security testing tools.

4. The method of claim 1, wherein changing, by the computer system, the starting set of the security testing tools in the portable security testing device to form the current set of the security testing tools in response to the starting set of the security testing tools being different from the selected set of the security testing tools comprises:
    removing a second subset of the security testing tools in the starting set of the security testing tools that is absent in the selected set of the security testing tools on the portable security testing device to form the current set of the security testing tools.

5. The method of claim 1, wherein at least one of a frequency in switching to the active mode increases or a time in the active mode increases as the portable security testing device moves towards a physical location for the target.

6. The method of claim 1 further comprising:
    receiving, by the computer system, the information from the portable security testing device in a form of audit data associated with at least one of geographic coordinates or a time stamp.

7. The method of claim 1, wherein the security testing tools are selected from at least one of a passive security testing tool, an active security testing tool, a radio frequency tool, a port scanner, a network scanner, a system finger print tool, or a penetration testing tool.

8. The method of claim 1, wherein the selected set of the security testing tools is selected based at least one of a device characteristic, the operating system, an amount of memory, a battery life, or target information.

9. A portable security testing device management system comprising:
    a computer system that configures a portable security testing device with an operating system, a starting set of security testing tools; determines a selected set of the security testing tools for the portable security testing device based on information about a target collected by the portable security testing device for a target; changes the starting set of the security testing tools in the portable security testing device to form a current set of the security testing tools in response to the starting set of the security testing tools being different from the selected set of the security testing tools; and cycles the portable security testing device between an active mode and an inactive mode in response to a movement of the portable security testing device towards the target, wherein the current set of the security testing tools operate to perform security tests on the target.

10. The portable security testing device management system of claim 9, wherein in changing the starting set of the security testing tools in the portable security testing device to form the current set of the security testing tools in response to the starting set of the security testing tools being different from the selected set of the security testing tools, the computer system installs a first subset of the security testing tools in the selected set of the security testing tools that is absent in the starting set of the security testing tools on the portable security testing device to form the current set of the security testing tools.

11. The portable security testing device management system of claim 10, wherein in installing the first subset of the security testing tools in the selected set of the security testing tools that is absent in the starting set of the security testing tools on the portable security testing device to form the current set of the security testing tools, the computer system installs the first subset of the security testing tools in the selected set of the security testing tools that is absent in the starting set of the security testing tools on the portable security testing device in a prioritized sequence to form the current set of the security testing tools.

12. The portable security testing device management system of claim 9, wherein in changing the starting set of the security testing tools in the portable security testing device to form the current set of the security testing tools in response to the starting set of the security testing tools being different from the selected set of the security testing tools, the computer system removes a second subset of the security testing tools in the starting set of the security testing tools that is absent in the selected set of the security testing tools on the portable security testing device to form the current set of the security testing tools.

13. The portable security testing device management system of claim 9, wherein at least one of a frequency in switching to the active mode increases or a time in the active mode increases as the portable security testing device moves towards a physical location for the target.

14. The portable security testing device management system of claim 9, wherein the computer system receives the information from the portable security testing device in a form of audit data associated with at least one of geographic coordinates or a time stamp.

15. A computer program product for managing a portable security testing device, the computer program product comprising:
a computer-readable storage media;
first program code, stored on the computer-readable storage media, for configuring the portable security testing device with an operating system and a starting set of security testing tools;
second program code, stored on the computer-readable storage media for determining a selected set of the security testing tools for the portable security testing device based on information about a target collected by the portable security testing device;
third program code, stored on the computer-readable storage media, for changing the starting set of the security testing tools in the portable security testing device to form a current set of the security testing tools in response to the starting set of the security testing tools being different from the selected set of the security testing tools, wherein the current set of the security testing tools operate to perform security tests on the target; and
fourth program code, stored on the computer-readable storage media for cycling the portable security testing device between an active mode and an inactive mode in response to a movement of the portable security testing device towards the target.

16. The computer program product of claim 15, wherein the third program code comprises:
program code, stored on the computer-readable storage media, for installing a first subset of the security testing tools in the selected set of the security testing tools that is absent in the starting set of the security testing tools on the portable security testing device to form the current set of the security testing tools.

17. The computer program product of claim 16, wherein the program code, stored on the computer-readable storage media, for installing the first subset of the security testing tools in the selected set of the security testing tools that is absent in the starting set of the security testing tools on the portable security testing device to form the current set of the security testing tools comprises:
program code, stored on the computer-readable storage media, for installing the first subset of the security testing tools in the selected set of the security testing tools that is absent in the starting set of the security testing tools on the portable security testing device in a prioritized sequence to form the current set of the security testing tools.

18. The computer program product of claim 15, wherein the third program code comprises:
program code, stored on the computer-readable storage media, for removing a second subset of the security testing tools in the starting set of the security testing tools that is absent in the selected set of the security testing tools on the portable security testing device to form the current set of the security testing tools.

\* \* \* \* \*